May 12, 1970   N. M. MILAN   3,510,952
HEIGHT GAUGE
Filed April 7, 1967   2 Sheets-Sheet 1
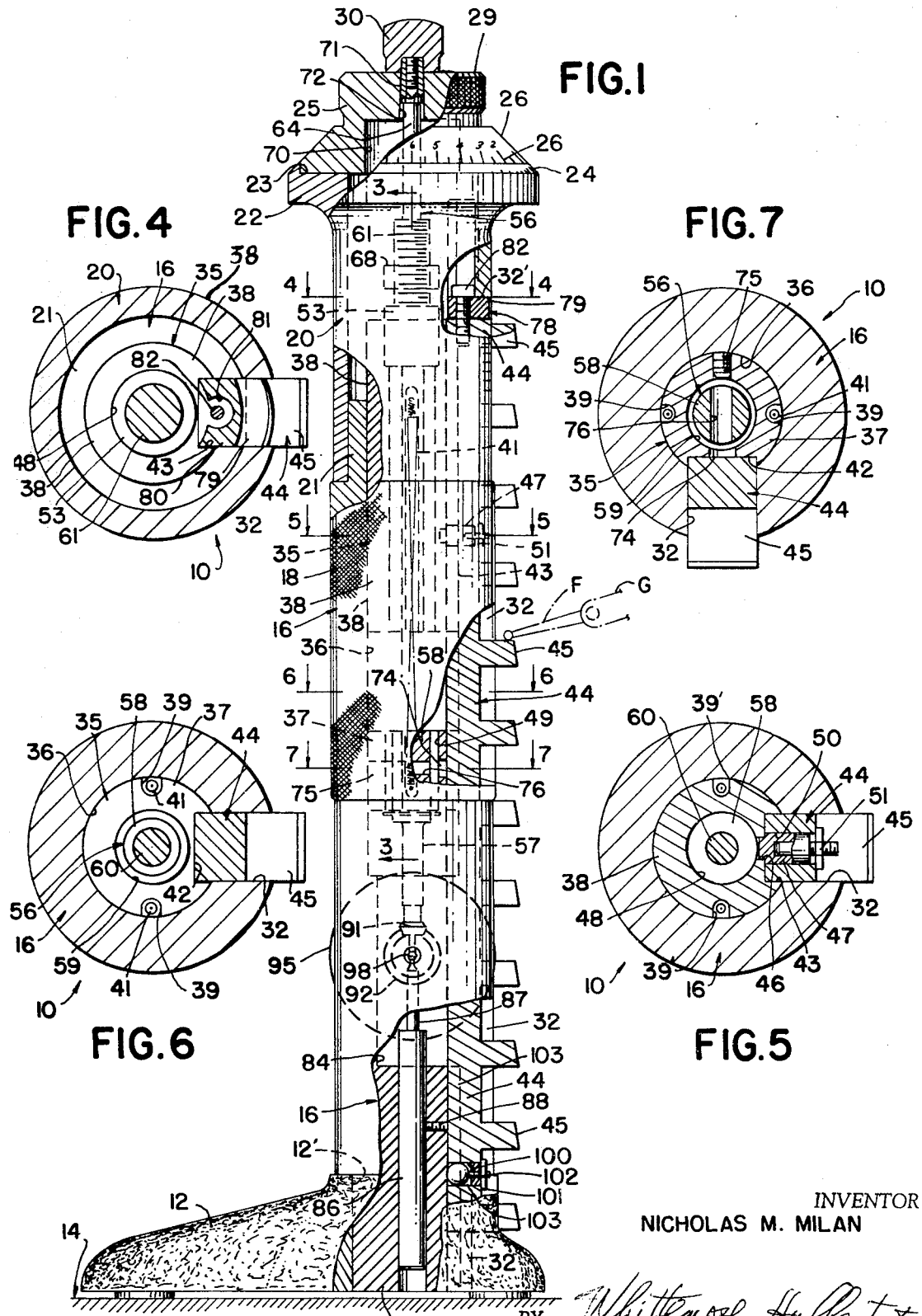
INVENTOR
NICHOLAS M. MILAN
ATTORNEY

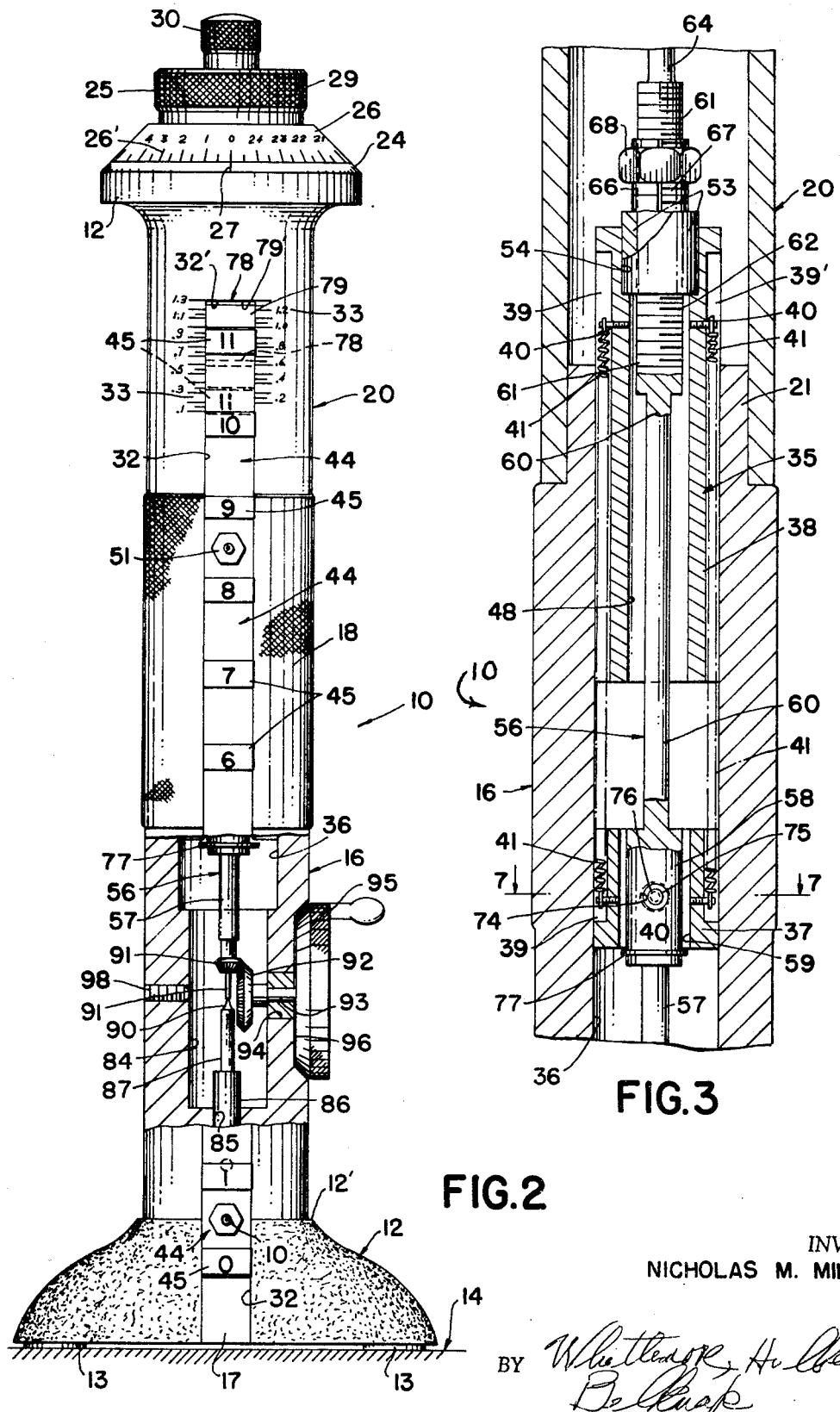

United States Patent Office 3,510,952
Patented May 12, 1970

1

3,510,952
HEIGHT GAUGE
Nicholas M. Milan, 4215 Courville,
Detroit, Mich. 48224
Filed Apr. 7, 1967, Ser. No. 629,147
Int. Cl. G01b 5/00
U.S. Cl. 33—170                                        8 Claims

ABSTRACT OF THE DISCLOSURE

The height gauge features a composite guide sleeve unit, one part of which is anchored within an upright tubular column structure, the second part of the sleeve unit being movable rapidly within the column structure through the agency of a micrometer threaded lead screw and nut arrangement, the screw of which is rotated by a 1:2 ratio, multiplying bevel gear drive operated directly from the exterior of the gauge by a hand wheel of substantial radius. The movable part of the guide sleeve unit is spring biased toward the fixed part. The gauge further includes an indicator bar having gauge steps which project radially through a vertically elongated guide slot of the column structure, these steps being spaced from one another with great accuracy; and a micrometer dial at the top of the column structure which rotates with the lead screw.

BACKGROUND OF THE INVENTION

Field of the invention

The improved gauge is a readily portable type used in making surface plate checks or inspections in manufacturing plants, tool making shops, and the like; and it may be utilized in making high precision measurement of an object or workpiece, directly from the latter, or in combination with a pre-set surface plate feeler gauge of high precision.

The especial merit of the improved gauge in this field of use stems from its own high degree of precision and capability of very fast and reliable manipulation through the agency of relatively inexpensive multiplying bevel gear and precision lead screw means.

Description of the prior art

My earlier patent, No. 3,106,022 of Oct. 8, 1963, discloses a generally similar type of height gauge having an electric motor powered actuation of its lead screw unit, coupled with a final fine micrometer adjustment to bring a vertically movable indicator step into engagement with a workpiece or other object or with a pre-set feeler gauge.

SUMMARY OF THE INVENTION

The vertically movable guide sleeve and indicator bar unit comprises three components, namely, a two-part guide sleeve unit including a fixed part and a movable part of which is vertically guided with very close tolerance within an upright tubular column. A spring biasing of the movable part down toward the fixed part insures against back-lash and objectionable wear at a critically important micrometer lead screw. A stepped indicator bar is fixed on the movable part to complete the three part unit, having indicator fingers, steps or projections

2 extending radially through and closely guided in an elongated slot in the column structure. The bar also has a substantially friction-free, ball-type sliding guide arrangement, including a ball projecting a minute fraction inwardly of the bar and non-rotatively slidable in error-free point engagement with a surface of the column structure.

A coarse reading of height, speeded up by means of a hand wheel and bevel gear traverse of the gauge bar, is taken from an upper indicator component of the latter. This is by reference of calibrations (in terms of 0.025" increments) staggered on either side of the column's guide slot; and a final fine reading (in terms of 0.0001" increments) taken from a micrometer dial head which rotates with the lead screw. The head is preferably operated manually, independently of the bevel gear and lead screw drive, in reaching the final determination and reading of height.

BRIEF DESCRIPTION OF THE DRAWINGS

FIG. 1 is a side elevational view of the improved height gauge of the invention, being extensively broken away and vertically sectioned in a plane including the axis of adjustment of the gauge, a typical use of a conventional feeler gauge in conjunction with the improved instrument being indicated in dot-dash line;

FIG. 2 is a front elevational view of the improved gauge, being also partially broken away and in section on an axial plane at 90° to that of FIG. 1 to illustrate features of the improved bevel gear-type, rapid traverse provisions of the invention;

FIG. 3 is a fragmentary enlarged scale view in vertical section on line 3—3 of FIG. 1, more clearly illustrating structural features of the rotatable lead screw and its coacting compound or two-part spring biased guide sleeve unit;

FIG. 4 is a somewhat enlarged scale view in horizontal section on line 4—4 of FIG. 1, illustrating a detail of construction for the mounting from above of a top indicator element to an elongated indicator bar of the gauge, as that bar is secured to a sliding guide part of the compound guide sleeve unit referred to above;

FIG. 5 is a detail view in horizontal section on line 5—5 of FIG. 1, showing the manner in which the indicator bar is secured to the movable sleeve component of said guide unit;

FIG. 6 is a view in horizontal cross section on line 6—6 of FIG. 1, illustrating coil type spring means for downwardly biasing the upper sleeve component; and FIG. 7 is a view in horizontal section on line 7—7 of FIGS. 1 and 3, illustrating provisions by which a second, fixed anchor element of the composite sleeve unit is fixedly secured within the tubular column structure of the height gauge.

DESCRIPTION OF A PREFERRED EMBODIMENT

Such column structure, referred to above and generally designated by the reference numeral 10, is a multiple part one, but is in effect unitary in nature. It comprises a relatively massive cast bottom base plate 12 having means, such as at accurately finished pads 13, for a stable, three point support on an appropriate flat surface. This would normally be that of an accurately finished surface plate 14. Column 10 further includes a lower tubular housing or column member, generally designated 16, which is force fitted at a reduced diameter bottom extension 17 into a throat opening at 12' of base 12. This is in a relation rendering the axis of column 10 precisely 90° normal to the supporing gauge plate surface 14. The tubular column member 16 is externally knurled at 18 for ease of manipulation.

An upper tubular column member 20 is, as best shown in FIG. 3, force fitted downwardly onto a reduced diameter top neck 21 of the housing or column member 16, in precisely coaxial relation to the latter. Upper column member 20 is radially outwardy flared at an integral top annular boss or flange 22, where it affords an upwardly facing, horizontal seat 23 within an annular beveled top extremity 24 of the flange, which seat 23 rotatively supports an inverted cup-shaped micrometer head 25. See FIG. 1.

This head is circumferentially calibrated (in an actual gauge) in 25 increments of 0.0001 inch each, for a total of twenty five ten-thousandths of an inch; and the calibrations are marked on a frusto-conical annular scale or dial surface 26 of head 25 which comes flush with the bevel 24 of the top column member's flange 22.

For simplicity and clarity, the calibrations (designated 26') appear much more coarsely in FIGS. 1 and 2 on micrometer-marked dial surface 26 than is the actual practice, in which they are in tenths of a thousand. The same is true of certain scale markings on column 10 which are hereinafter referred to. The point is, of course, that the micrometer indicia 26' are used in minute interpolation of less coarse (though still micrometric) readings taken from the mentioned column markings.

As shown in FIG. 2 fixed column bevel 24 has an indicium 27 for coaction with the calibrations 26' on dial surface 26 of micrometer head 25. The latter is externally knurled at 20 for ease of rotative manipulation; and the head 29 is held downwardly in place (through means to be described), this means including a cap screw 30.

Referring to FIGS. 2 and 4 through 7, the composite column 10 of the improved height gauge is provided throughout a substantial part of its total height (and the sum of all of its components 12, 16 and 20) with an outwardly opening slot 32. This extends radially through the base 12 of the column, commencing at the bottom of the latter, through the tubular housing member 16 telescoped in the base, and through a good part of the upper column member 20, the slot 32 terminating at 32' (FIGS. 1 and 2) somewhat beneath the flared flange 22 of the member 20. For a limited distance beneath the top of, and on either side of, the slot 32, the member 20 bears upwardly and laterally staggered, calibrations 33 in equally subdivided markings. Actually the calibrations 33 are each in terms of four quarter-values of 0.025", although they are more coarsely depicted in FIGS. 1 and 2; and their use in conjunction with the still more finely calibrated indicia 26' on the micrometer scaled, rotative dial head 25 will be obvious, or readily apparent from the description to follow.

Briefly, intermediate readings at 33 of the order of 0.0125" supplemented or interpolated into values as slight as 0.0001" by visual reference to the frusto-conical, rotatable dial surface 26, calibrated in this degree of micrometric terminology. The last is a final fineness reading carrying out the secondary reading of calibrations 33 on column member 20; and this observation is materially facilitated and expendited by the staggered arrangement of the markings on both sides of the column slot 32 in member 20.

A composite, two-part guide sleeve unit, generally designated 35 (FIGS. 1 and 3), is coaxially telescoped into the cylindrical bore 36 of the intermediate upright housing or column member 16, which bore opens radially outwardly through slot 32 to the exterior of column 10, proper, as appears in FIG. 2. Unit 35 comprises a lower fixed anchoring sleeve member 37 and an upper, axially slidable sleeve member 38, the members 37, 38 being of identical tubular cross section, and being identically oriented within the column bore 36.

Thus, as shown, the anchoring sleeve member 37 is formed to provide small, diametrically opposite and axially extending grooves 39 throughout the upper portion of its axial length just above the bottom thereof; while the upper, axially movable sleeve member 38 has similar, but substantially more elongated grooves 39' along the major part of its axial length, commencing downwardly just beneath the top thereof. Radially extending pins or set screws 40 (FIG. 3) threaded into the tubular walls of sleeve members 37 and 38 anchor opposite ends of a pair of elongated coil tension springs 41, so that, with the lower sleeve member 37 fixedly secured within the column bore 36 (by means hereinafter described in detail), the upper sleeve member 38 is at all times resiliently biased downwardly by pre-loaded springs 41. This is an important attribute of the improved gauge, as will later appear.

Further in regard to the similarity of the lower and upper guide members 37 and 38, respectively, the former, as shown in FIGS. 6 and 7, has an axially elongated, radially outwardly opening and rectangular sided recess or groove 42 throughout the axial length thereof, while the latter has a similar groove 43 (FIGS. 4 and 5) throughout its axial length; and these two grooves are in precise axial register with one another. Their purpose is to accommodate an axially elongated gauge or indicator bar 44 in a precision ground, mated relationship, with the bar 44 fixedly secured to the upper, axially slidable guide sleeve 38 for movement therewith, and presenting a series of exactly equally spaced indicator fingers or steps 45, exactly spaced at intervals of one inch (in the tolerance referred to above), to project through the axially elongated slot 32 of the column unit 10.

For the purpose of fastening the bar 44 to the sleeve guide member 38, and as illustrated in FIG. 5, the member 38 is provided with a small radial bore 46, into which is force fitted the reduced diameter inner end of an internally threaded cylindrical plug 47, the plug terminating short of the cylindrical bore 48 of sleeve member 38 and projecting radially outwardly of the latter within its axially elongated groove 43. The force fitted connection (or a welded or other rigid joint) in effect constitute the plug 47 a unitary part of upper sleeve member 38, projecting radially outwardly of the periphery of the latter as appears in FIG. 5.

Indicator or gauge bar 44 has a cylindrical bore 50 which telescopes snugly onto plug 47; and a lock screw member 51 threaded into plug 47 engages radially inwardly against the outer surface of indicator bar 44, thus to fasten the latter rigidly to movable sleeve member 38 as, in effect, a unitary part of the latter.

Sleeve member 38 has a special lead screw nut 53 force fitted into a counterbore 54 at the top thereof, the nut thus in effect constituting a unitary part of member 38; and nut 53 operatively receives an axially elongated, one-piece lead screw, generally designated 56, of a special character.

Reference being had to FIGS. 2 and 3 in conjunction with FIG. 1, screw 56 comprises a lower stem portion 57, which is coaxially disposd in the bore 36 of column 10 and has gear provisions at the bottom thereof, as will be described; a large diameter barrel portion 58 of cylindrical cross section, which is coaxially disposed in the cylindrical bore 59 of the anchoring sleeve member 37, and also has hereinafter described means to assist in the fixed anchoring of the latter within the column bore 36; an intermediate stem portion 60 extending integrally from and coaxially upwardly of barrel portion 58, stem 60 being of considerable height; an enlarged diameter, second barrel portion 61, which has threading of micrometer fineness at 62 precisely mating internal threading of the threaded screw nut member 53; and an upper stem portion 64.

For the purpose of enabling an adjustment of friction between nut 53 and the threaded barrel portion 61 of lead screw 56, the nut has an integral upper tubular extension 66 which is split at 67 and externally threaded to receive a take-up nut 68. Extension 66 is tapered a trifle so that a downward threading of nut 68 thereon will increase the frictional grip of nut 53, as a whole, on lead screw threading 62; and, taken in combination with the effect of the sleeve biasing springs 41, this adjustment enables the preservation of a desired measure of continual frictional downward bias on the upper, axially movable sleeve member 38 of the guide sleeve unit 35.

Top stem portion 64 of lead screw 56 extends upwardly, as appears in FIG. 1, through an interior space 70 of the dial-type micrometer head 25, and terminates in a frusto-conical top formation 71, which is frictionally received in a correspondingly tapered central upper bore 72 in head 25, projecting a bit above the top of the latter. The cap nut 30 referred to before threads downwardly into the stem formation 71 and onto micrometer head 25, causing the latter to tightly grip the stem portion 64, and thereby effectively couple the finely calibrated micrometer head for rotation with lead screw 56, when the latter is rotated by gear provisions hereinafter described, as well as when head 25 is manually rotated.

For the purpose of rigidly connecting the anchor sleeve member 37 of unit 35 to the column 10, in the intermediate column or housing member 16 of the latter (reference being had to FIGS. 1, 3 and 7), the member 37 is provided with a radial hole 74 communicating its cylindrical axial bore 59 with its axially extending groove 42, and member 37 is also radially drilled and tapped diametrically opposite the hole 74 to receive a set screw 75. This screw is taken up tightly against the surface of column bore 36, thus to anchor sleeve member 37 as, in effect, a fixed internal adjunct of column 10, which assists in axially guiding the indicator or gauge bar 44 as the latter moves vertically with the upper guide sleeve member 38.

In order to enable the position of fixed sleeve member 37 to be properly set, axial-wise, without removing the lead screw 56 from the instrument, the barrel portion 58 of the lead screw, which is located in the zone of the locking set screw 75 is provided, as shown in FIG. 7, with a diametral through bore 76, which, when brought into alignment with the radial hole 74 of sleeve member 37, enables the screw 75 to be conveniently manipulated, using a screw driver or Allen wrench.

In addition, for the purpose of preventing lower sleeve member 37 from unduly dropping downwardly before and while it is secured to the column (reference being had to FIGS. 2 and 3), the barrel portion 58 of lead screw 56 is equipped with a split ring 77, onto which the sleeve member 37 may downwardly rest, thus to limit movement in that direction while being properly anchored to column member 16.

As best illustrated in FIGS. 1 and 4, the indicator bar component 44 of the movable sleeve member 38 of the spring biased unit 35 (shown at its top-most position in FIG. 1, as well as in solid line in FIG. 2) has a vertically elongated and L-shaped indicator piece 78 secured to the top thereof for movement as a unit therewith. FIG. 4 shows the piece 78 as comprising a lower, radially outwardly projecting toe extension 79, which extends through the slot 32 of upper column member 20 and presents an indicator line 79' which is visible from the column exterior; and a vertically extending, integral leg 80 outwardly paralleling the lead screw 56 within member 20.

Leg portion 80 is formed to provide an upwardly extending slot or side recess 81 of substantial size to accommodate the enlarged head of a machine screw 82, which screw extends downwardly through an opening in indicator piece 78 into threaded engagement with the top of gauge piece 78. FIG. 2 shows, in dotted line, the indicator piece in a lower position than the extreme upper position thereof which is depicted in solid line in FIGS. 1 and 2.

As illustrated in FIGS. 1 and 2, the tubular member 16 of column 10 is formed, beneath its sleeve accommodating bore 36, with a cylindrical chamber 84 of smaller diameter opening upwardly to that bore. The chamber 84 terminates above the bottom of the column member 16; and a still smaller size axial bore 85 extends from the bottom of gauge base 12 to chamber 84. Bore 85 axially receives the cylindrical body 86 of an upright trunnion or journal pin 87; and the body 86 is fixedly secured to column member 16, as by a set screw 88 (FIG. 1) threaded in a radial bore in the latter into clamping engagement with the trunnion piece, or pin.

The latter has a needle-shaped top extremity at 90; and the lower lead screw stem portion 57, which is fixedly equipped with a small bevel pinion 91, seats and journals on needle formation 90 at a reduced diameter, downwardly depending seat element 91 of stem portion 57.

The bevel pinion 91 meshes without lost motion with a bevel gear 92 horizontally journalled in chamber 84, the circumference ratio of pinion to and gear being 1:2 for a desired high speed rotation of lead screw 56, and consequent rapid elevation of the guide sleeve-bar unit 35, 44 by lead screw 56.

Bevel gear 92 is journalled by a radially extending shaft or stem 93 in an appropriate bushing 94 which is fixedly set into the wall of column member 16 adjacent the bottom of the latter; and a relatively large diameter hand wheel 95 connects to stem 93 to manually rotate gear 92 for an initial coarse traverse of the sleeve-bar unit. For compactness and improved appearance, hand wheel 95 is set into slight recess or depression at 96 in the side of the column 10.

Furthermore, in order to facilitate the dismantling of the bevel gear unit, if desired, for inspection or replacement, the column wall is provided, diametrically opposite the bushing 94, with a small bore normally receiving a threaded closure plug 98. This plug may be removed to permit insertion of a small drift or like tool, for the purpose of driving out the bevel gear stem 93 and/or bushing 94, thus enabling a dismantling of bevel gear drive.

As fixedly secured in the manner described to guide sleeve member 38 at the radially projecting plug 47 on the latter, the gauge bar 44, when slidably mated into the column slot 32, fixedly nested in the groove 43 of sleeve member 38 and slidably nested into the groove 42 of member 37, has improved means for its own accurate and anti-friction guidance (hence that of member 38) is limited vertical gauging movements.

Thus, for a practically friction-less, guided vertical traverse, up and down (reference being had to FIG. 1), the bar 44 is provided adjacent its lower extremity with a radial through opening 100, into which a hardened guide ball 101, such as a ball bearing, is very snugly received, i.e., with a tight finger pressure fit such as will preclude rotation of ball 101 in opening 100. An adjustable screw unit 102 is threaded into an insert 103 force-fitted into the opening; and screw 102 inwardly engages the guide ball. It may be manipulated to exert radial force on the ball until the latter projects, say, as little as 0.0001" inwardly of the opening 100. This draws the lower end of indicator bar 44 radially outwardly to the extremely small fractional extent mentioned, which may be determined by the use of an amplifying indicator. This affords a point-engaged sliding guidance of bar 44 against the base of a slot 103 at the bottom of column member 16. Ball 101 does not rotate, since this would represent a looseness sufficient to introduce inacceptable error.

In the use of the improved gauge, it is placed upon the surface plate 14 and the hand wheel 95 is operated in one direction or the other to bring one of the indicator bar fingers or steps 45 either into direct engagement with the workpiece or object being gauged or, as indicated in dot-dash line in FIG. 1, with the feeler F of a conventional precision gauge G which has been accurately pre-set by reference to the workpiece or object. The coarse adjustment is rapidly carried out until the zero-set pointer of gauge G moves.

As indicated above, the gauge steps 45 are of identical height and vertically spaced precisely one inch from one another, being marked in terms of basic inches. As indicated above, the spacing is within 50 millionths of an inch tolerance.

Whether in the initial coarse traverse of upper guide sleeve member 38 and the indicator bar 44, through the agency of lead screw 56 and a speed multiplying gear combination operated at a greater multiplication by the relatively large diameter hand wheel 95, or in an ensuing fine micrometer traverse, the biasing springs 41, under preloaded tension, insure that the threads 62 of lead screw portion 61 will always downwardly engage the corresponding micrometer threading of nut 53. The degree of friction effective between that and screw portion 61 to resist rotation of the latter is readily adjustable by a manipulation of the take-up nut 68 on the slotted extension 66 of nut 53; but whatever the degree of friction may be, springs 41 insure a uniform wear on the lead screw 56, and no back-lash in nut 53 or the bevel gearing in either direction of vertical traverse, coarse or fine. In short it is unnecessary to make an overrun and reverse return in order to eliminate the effect of back-lash.

The staggering of the relatively coarse column calibrations 33 on opposite sides of slot 32 makes for a quick and strain-free reading of the rough height in inches, plus, of the gauged object. This is by reference to the indicator line 79' on the top member 78 of gauge bar 44; this coarse reading is nevertheless to a fineness of 0.025". The gauging is completed by manipulating the knurled head 25 and its lead screw-rotated dial 26; and the reading here, in reference to the fixed column pointer 27 is readily taken off, being added to or subtracted in multiples of 0.0001" from the reading at column calibrations 33.

Unassisted other than by its stable support on surface plate 14, and in some cases the dial gauge G, the improved instrument can check heights of as little as 0.250" (the distance above the plate of its lower-most step 45 when the bar 44 is bottomed out) to as much as 12.250" (when its top-most indicator member 78 upwardly engages the column slot 32 at 32'). If objects of a quarter inch or less height are to be checked they will be placed on a precision block of known height, which is then subtracted from the reading at scale surface 26.

Great speed of operation is coupled with high precision accuracy and reliability, due to the combination of the spring-biased guide sleeve means, the speed multiplying factors, and the anti-friction arrangements.

Prior to the present gauge improvement, conventional gauges of this type were constructed utilizing cast housings, with lead screws attached at the top of the castings, or suspended with brackets guiding individual laminated steps. The disadvantages of both of these principles reside in the fact that the castings will change in stability, causing errors. Also, the greatest problem with either of these two types of gauges arises in the shipment thereof from one area to another by either plane or other form of transportation. For example, under changes of temperature and/or abusive handling these two types of gauge will deviate from their original check of accuracy. The present gauge eliminates both factors inasmuch as it is self-suspended at a bottom point, and the steps are integral parts of one solid column.

What is claimed is:

1. In a precision height transfer gauge, comprising a vertically elongated tubular column provided with a laterally opening slot extending throughout a major portion of the height of the column, a vertically extending gauge bar non-rotatably but vertically slidably received in said slot, a guide unit including a fixed tubular part in said column, a movable tubular part guided for limited vertical traverse in said column, fastening means intermediate the ends of said gauge bar extending into said movable tubular part, spring means in said column biasing said movable part toward the fixed part, a lead screw and nut unit in said column, said last named unit comprising a nut member fixed to and having vertical traverse with said movable part, a vertically elongated screw member extending through said guide unit parts and threadedly engaging said nut member under axial force exerted by said biasing spring means, thus to maintain constant pressure engagement of said screw and nut members at the threading thereof, and means to rotate said screw member to effect traverse of the nut member and said movable part as a unit and to thereby impart vertical movement to said gauge bar.

2. In the gauge of claim 1, in which said last-named means comprises a rotation multiplying, gear type drive connection between a manually operated wheel member radially external of said column and one end of said screw member of said lead screw and nut unit, said connection applying the rotative force to said screw member along the axis thereof.

3. In the gauge of claim 1, in which said last-named means comprises a rotation multiplying, gear type drive connection between a manually operated wheel member radially external of said column and one end of said screw member of said lead screw and nut unit, said lead screw member being of one-piece construction, including a first threaded portion engaged by said nut member, a section coaxial portion within the axial zone of said fixed tubular part of said guide unit, and a third portion at which said drive connection is made, said connection applying the rotative force to said screw member along the axis thereof.

4. In the gauge of claim 3, in which said lead screw member has a calibrated scale element rotatable therewith for coaction with calibrated indicia on said column, said nut member having a gauge part movable therewith and marked for coaction with further calibrated indicia on the column.

5. In the gauge of claim 3, in which said lead screw member has a calibrated scale element rotatable therewith for coaction with calibrated indicia on said column, said nut member having a gauge part movable therewith and marked for coaction with further calibrated indicia on the column, said second portion of the lead screw member having a diametral hole to accommodate a fastener fixedly connecting said fixed tubular part of the guide unit to said column.

6. In a precision height gauge, comprising a vertically elongated tubular column, a guide unit in said column including a fixed part and a movable part, said movable part having limited vertical traverse in said column, relative to the fixed part, a lead screw and nut unit in said column, said last-named unit comprising a nut member having vertical traverse with said movable part, and a screw member threadedly engaging said nut member, a calibrated scale element mounted on said column and attached to one end of said screw member, said scale element being rotatable with said screw member for coaction with calibrated indicia on said column, a manually operated hand wheel radially external of said column, and rotation multiplying gearing within said column operatively connecting said wheel with the other end of said screw member, said gearing comprising a bevel gear of relatively large diameter rotated by the hand wheel and a bevel pinion of relatively small diameter fixed on said other end of the screw member and meshing with said gear.

7. In the gauge of claim 6, in which said guide unit comprises said movable part and a further, axially elongated gauge bar fixedly secured to the movable part for traverse therewith, said gauge bar having means in limited anti-friction sliding engagement with said column in the gauging adjustment of the movable part and gauge bar as a unit, said means on the bar comprising a ball received in an opening in the bar and having sliding guide engagement with the column.

8. In the gauge of claim 6, in which said guide unit comprises said movable part and a further, axially elongated gauge bar fixedly secured to the movable part for traverse therewith, said gauge bar having means in limited anti-friction sliding engagement with said column in the gauging adjustment of the movable part and gauge bar as a unit, said means on the bar comprising a ball non-rotatively received in an opening in the bar and having sliding guide engagement with the column.

References Cited

UNITED STATES PATENTS

| | | | |
|---|---|---|---|
| 495,565 | 4/1893 | Renko | 33—170 |
| 717,716 | 1/1903 | Robbins | 33—159 X |
| 2,252,146 | 8/1941 | Walsh | 33—170 |
| 3,106,022 | 10/1963 | Milan | 33—170 |
| 3,289,310 | 12/1966 | Stone | 33—170 |

FOREIGN PATENTS

| | | |
|---|---|---|
| 961,497 | 11/1949 | France. |
| 875,817 | 8/1961 | Great Britain. |
| 996,095 | 6/1965 | Great Britain. |

HARRY N. HAROIAN, Primary Examiner